United States Patent
Zhang et al.

(10) Patent No.: US 11,513,255 B2
(45) Date of Patent: Nov. 29, 2022

(54) METHOD OF CHARACTERISING A SUBSURFACE VOLUME

(71) Applicant: TOTAL SE, Courbevoie (FR)

(72) Inventors: Jiazuo Zhang, London (GB); Gavin Henry Graham, Aberdeen (GB)

(73) Assignee: TOTAL SE, Courbevoie (FR)

( * ) Notice: Subject to any disclaimer, the term of this patent is extended or adjusted under 35 U.S.C. 154(b) by 517 days.

(21) Appl. No.: 16/500,474

(22) PCT Filed: Apr. 3, 2017

(86) PCT No.: PCT/EP2017/057863
§ 371 (c)(1),
(2) Date: Oct. 3, 2019

(87) PCT Pub. No.: WO2018/184654
PCT Pub. Date: Oct. 11, 2018

(65) Prior Publication Data
US 2020/0124764 A1    Apr. 23, 2020

(51) Int. Cl.
*G06N 3/04*    (2006.01)
*G01V 99/00*   (2009.01)
*G06K 9/62*    (2022.01)

(52) U.S. Cl.
CPC ......... *G01V 99/005* (2013.01); *G06K 9/6257* (2013.01); *G06K 9/6277* (2013.01); *G06N 3/0454* (2013.01)

(58) Field of Classification Search
CPC .......................... G06K 9/6257; G06N 3/0454
See application file for complete search history.

(56) References Cited

U.S. PATENT DOCUMENTS

| | | |
|---|---|---|
| 2012/0215511 A1 | 8/2012 | Sarma et al. |
| 2012/0265512 A1 | 10/2012 | Hu et al. |
| 2018/0067229 A1* | 3/2018 | Li .................... G01V 99/005 |

OTHER PUBLICATIONS

Tympel, Jens, "International Search Report," prepared for PCT/EP2017/057863, dated Dec. 8, 2017, four pages.
Bertoncello, Antoine, "Conditioning Surface-Based Geological Models to Well and Thickness Data," Retrieved from the internet: URL:https://purl.stanford.edu/tr997gp6153 [retrieved on Nov. 22, 2017], Aug. 2011, pp. 1-141.
Trani, Mario, et al.; "History-Matching Surface-Based Property Models Using the Ensemble Kalman Filter"; Petroleum Geoscience, vol. 23, No. 2; Oct. 14, 2016; pp. 210-222.
Prosser, Patrick; "Hybrid Algorithms for the Constraint Satisfaction Problem"; Computational Intelligence, vol. 9, No. 3; Aug. 1993; pp. 268-299.

* cited by examiner

*Primary Examiner* — Edward Park
(74) *Attorney, Agent, or Firm* — Lando & Anastasi, LLP (57) ABSTRACT

Disclosed is a method of conditioning one or more parametric models. The method comprises obtaining a plurality of candidate parametric models, each describing a sequence of domains characterising a subsurface region and determining whether each sequence of domains described by one or more of said candidate parametric models is a valid sequence of domains. For each valid sequence of domains, each candidate parametric model describing that valid sequence of domains (or a subset of these models) is conditioned simultaneously, for example by using an Ensemble Kalman Filter or artificial neural network.

28 Claims, 4 Drawing Sheets

METHOD OF CHARACTERISING A SUBSURFACE VOLUME

The present disclosure relates to methods of characterising a subsurface volume, and in particular to generating parametric geological models.

The typical process to establish oil and gas production forecasts includes the construction of 3D subsurface models and flow simulation using such models as an input.

Subsurface models may comprise, for example, reservoir flow, basin, geo-mechanical and geological models. These comprise gridded 3D representations of the subsurface used as inputs to a simulator allowing the prediction of a range of physical properties as a function of controlled or un-controlled boundary conditions:

Reservoir flow models aim to predict fluid flow properties, primarily multi-phase rates (and composition), pressure and temperature, under oil and gas field or aquifer development scenarios.

Basin models aim to predict over time the types of hydrocarbon being generated out of kerogen, and the location of hydrocarbon trapping at geological timescales.

Geo-mechanical models aim to predict stress and stress related phenomenon such as heave/subsidence or failure in natural conditions or under oil and gas or aquifer development conditions.

Geological models aim to characterize the geological description of the reservoir and the volume of oil in place.

Conditioning parametric models to static data has been a long standing challenge in reservoir modelling, as it is required to specify parameters for the geological model which are difficult to infer from the available data and are unknown a priori. Parametric models have no predefined grid or mesh, and may comprise (for example) surface-based models. The problem becomes more complex to resolve in the presence of a large number of data to honour, and if the geological domains to be conditioned are large with respect to the overall domain being modelled. Furthermore, previously documented approaches are computationally intensive and require significant time to produce conditioned geological models.

It is therefore desirable to develop a more efficient method to condition parametric models in order to minimize computation cost and mismatch with data, while preserving geological variability in the final models.

SUMMARY OF INVENTION

In a first aspect of the invention there is provided a parametric model conditioning method comprising: obtaining a plurality of candidate parametric models, each describing a sequence of domains characterising a subsurface region; determining whether each sequence of domains described by one or more of said candidate parametric models is a valid sequence of domains; and for each valid sequence of domains, simultaneously conditioning a plurality of the candidate parametric models describing that valid sequence of domains.

Other aspects of the invention comprise a computer program comprising computer readable instructions which, when run on suitable computer apparatus, cause the computer apparatus to perform the method of the first aspect; and an apparatus specifically adapted to carry out all the steps of any of the method of the first aspect.

Other non-essential features of the invention are as claimed in the appended dependent claims.

BRIEF DESCRIPTION OF THE DRAWINGS

Embodiments of the invention will now be described, by way of example only, by reference to the accompanying drawings, in which:

FIG. 3 shows (a) an example of conditioned geological domains represented using NURBS, and (b) the results of modelling the geological domains through lines AA, BB and CC as represented in FIG. 3(a)

DETAILED DESCRIPTION OF THE EMBODIMENTS

Known pixel-based geological modelling methods, such as Sequential Indicator Simulation (SIS) and Multi-Point Statistics (MPS) populate geological properties on a predefined mesh. Static geological data is populated into discrete mesh properties at static data locations, before the geological simulation, resulting in the data being directly honoured. However, with mesh-free geological modelling methods such as surface-based models (more generally referred to as parametric models), no mesh is defined within which to populate geological properties at the static data locations. Static data may comprise well log/core data and/or seismic data, in contrast to dynamic data (e.g., pressure and flow data)

The simplest method proposed to condition parametric models is to generate the geological domains using rejection sampling, but this is computationally intensive. Alternatively, the position and sequence of geological domains could be directly identified or interpolated between wells but this approach requires a dense volume of data, which may be unrealistic for many subsurface developments. Direct conditioning, in which the available data is directly used to generate geological domains, remains an outstanding challenge as it is difficult to infer geometries and hierarchies away from the data, and as such has only been applied to simplified reservoir models. Finally, the number of parameters to optimize can be reduced in order to make the problem more manageable. There are several limitations to such an approach, however: (1) reducing the number of parameters may not always be possible if the uncertainty intervals are large; (2) the variability of the final conditioned parameters between models is not known, and (3) each model is optimized independently so it remains computationally expensive.

Lastly, a drawback that is common to all previously documented approaches and limits their efficiency, is that the position of a geological domain with respect to the wells is simultaneously optimized alongside the parameters that control the characteristics of the geological domains themselves. This means that initial geological domains can be conditioned to the given data, only to fail to at a later stage. This is because the sequence of geological domains cannot look forward in time to obtain the outcome of the decision to condition a particular geological domains to a given well at an earlier point in time. In the previously documented approaches this results in the conditioning process being restarted, increasing the computational time to solve the problem.

It is therefore proposed to decouple the conditioning process into two stages. A first stage determines a range of acceptable sequences of geological domains (e.g., lobes) with respect to the data. A Sequence in this context may refer to the relative sequence of domains with respect to the positions of wells and/or to seismic data within the reservoir zone. As such, a sequence of domains may describe, for example which domains intersect which wells and/or correlates with measured seismic data from the reservoir. In an embodiment, this stage may comprise finding a solution to a constraint satisfaction problem. The constraint may be based on known data points from actual wells and/or inferred from seismic data. For example, the constraint may be that each well intercepts at least one domain. "Each well" in this context may include all wells, or only producing wells. For example, exploratory wells may be ignored. Alternatively, exploratory wells may be included, such that for example, the knowledge that such an exploratory well does or does not intercept a domain may be included in the constraint satisfaction problem. In an embodiment, a backtracking algorithm may be used to solve the constraint satisfaction problem. The backtracking algorithm may comprise an intelligent backtracking algorithm, or backjumping algorithm, which is not limited to backtracking chronologically; instead it could directly go to the domain causing the conflict (e.g., conflict directed backjumping). In addition a forward checking (look-ahead) algorithm may be used to check whether a current domain causes a conflict with future domains. Backtracking, backjumping and forward checking algorithms are known generally for solving constraint satisfaction problems (for example refer to *Hybrid algorithms for the constraint satisfaction problem*, Prosser, Computational intelligence Vol 9, No 3 p. 268-299, 1993, which is hereby incorporated by reference) and a detailed discussion of how they operate will not be included here.

During this first stage, no model parameters are conditioned. However, the spread of one or more initial input distributions may be reduced in order to meet the constraints imposed. When a domain is simulated and does not allow for a valid domain placement, an analytical deduction can be made as to why the domain did not place. For example, the domain may not satisfy a well constraint for a particular range of orientations that are present in the initial distribution. For such a domain, the orientation distribution may be reduced so that only a smaller range of values could be stochastically sampled. This means that some of the input distributions have been reduced. This reduces the non-linearity of the problem and helps with the EnKF (see below). For ANNs (also see below) it means the modified input distributions are used as a starting point.

The backtracking algorithm may be used to explore the range of sequences that can be produced with respect to the data using the user-defined input parameters. This is done as the position and sequence of geological volume deposition is unknown a priori, so it is not known which observed data is required at each conditioning timestep in the second stage. In contrast to dynamic reservoir models, it is unlikely that all observed data is required at each conditioning timestep (conditioning of each domain) when conditioning static geological models. This information is then used to create an indicator (or indicators) at each well which determines the geological domains in the sequence that appears at the well. This approach is extremely efficient as it allows for a forward checking component that can be used to predict if a given sequence of domains will fail with respect to the data, which improves computational efficiency. At the end of this stage of the conditioning, a range of sequences that respect the position of the geological domains in subsurface data with respect to the input data are obtained. However, the model parameters have not yet been optimized to minimise the misfit between the simulated geological domains and the subsurface data.

In a second stage, once a range of possible sequences is determined, all the models for a given sequence can be conditioned simultaneously. Any suitable method for parallel model conditioning may be used (e.g., neural network methods). In an embodiment, however, an Ensemble Kalman Filter (EnKF) may be used.

The Ensemble Kalman Filter

The EnKF is a sequential data assimilation method used to interpret the current system status and to predict the next data observations according to the current observation data. The EnKF method is more commonly used for the assisted history-matching of dynamic reservoir models, but can also be used to adjust geological parameters in static reservoir models to honour subsurface data. The EnKF quantifies uncertainties of the system status and predictions, which can be used to generate multiple conditioned geological domains that honour the subsurface data. It is proposed, in an embodiment, that the EnKF is used to optimize the model parameters for a given geological sequence.

The EnKF is based on the classical Kalman filter (KF). Kalman filtering tries to combine information from the model and observations to update the state vector which contains the parameters to update. Using Bayes theorem, the posterior density function of the analysed state vector $x^a$ can be expressed as:

$$J[x^a] = (x^f - x^a)^T (C_{xx}^f)^{-1} (x^f - x^a) + (d - Hx^a)^T (C_{\in\in})^{-1} (d - Hx^a) \qquad (1)$$

where $C_{xx}^f$ is the model covariance matrix, and $C_{\in\in}$ is the observation error covariance matrix (a diagonal matrix of the size of production data with the data noise variance on the diagonal). H is the operator (reservoir simulator) relating the model parameters to the observed data, d the observed data to match, and $x^f$ is previous estimate state vector (the superscript T signifies a transpose of a vector or matrix).

The function J can be read in the following way: the first term represents the prior information, or the initial estimate of the state, while the second term is the conditional probability of the data. The minimum of J is found by differentiating it with respect to $x^a$. The minimum of this function, which corresponds to the maximum likelihood estimate is:

$$x^a = x^f + K(d - Hx^f) \qquad (2)$$

The Kalman gain matrix K is expressed as:

$$K = C_{xx}^f H (H C_{xx}^f H^T + C_{\in\in})^{-1} \qquad (3)$$

The Kalman gain is the ratio between the covariance of the model error with the observations and the sum of the covariance of the predicted observations with the forecast error covariance matrix. This can be interpreted as the ratio between the model uncertainty and the sum of the uncertainties related to the model and to the observations. The analyzed (posterior) model error covariance analysis is expressed as:

$$C_{xx}^a (I - KH) C_{xx}^f \qquad (4)$$

which can be derived as the minimum error variance of the analyzed estimate (I is the identity matrix). Therefore, the Kalman filtering seeks the maximum likelihood estimate which coincides with the minimum variance unbiased estimate in the case of Gaussian priors and model linearity.

An important shortcoming of the KF is that the prior and the posterior true error covariances need to be stored and propagated in time. This gives rise to two limitations. First, the true error is never known; second, since those matrices have equal size as the square of the state vector, the method is not easily applicable to high dimensional models. The EnKF is a Monte Carlo, sequential method which circumvents these two important limitations of the KF by representing the error covariance matrix with an ensemble of model realizations. Unlike the KF, in the EnKF N realizations representing the state vectors (called 'ensemble members') are treated as a sample from the prior distribution of the model state at a certain time, and their mean is treated as the state estimate from the forecast model in the standard KF. The spread in the ensemble (standard deviation) represents the initial model uncertainty around the mean. With respect to the KF, in the EnKF the matrix $C_{xx}^f$ is replaced by $P^f$, the ensemble forecast covariance matrix is defined as:

$$P^f = \frac{A'A^T}{N-1} \quad (5)$$

with A' being the ensemble perturbation matrix (state vector−ensemble mean). The term $P^f H^T$ is the ensemble cross-covariance matrix between modeled parameters/states $P^f$ and observations while $HC_{xx}H^T$ indicates the ensemble-based error covariance matrix of simulated measurements. In the EnKF the update step is computed using the KF (Equation 3) but avoids the computation and the storage of the full covariances matrices for model and measurement uncertainties, as the initial realizations are drawn randomly from the prior model variables distribution. The update is based on the first two-points statistics of the distributions, limiting the performance of the filter when the Gaussian assumption is strongly violated.

Parallel Model Conditioning

Figure 1:
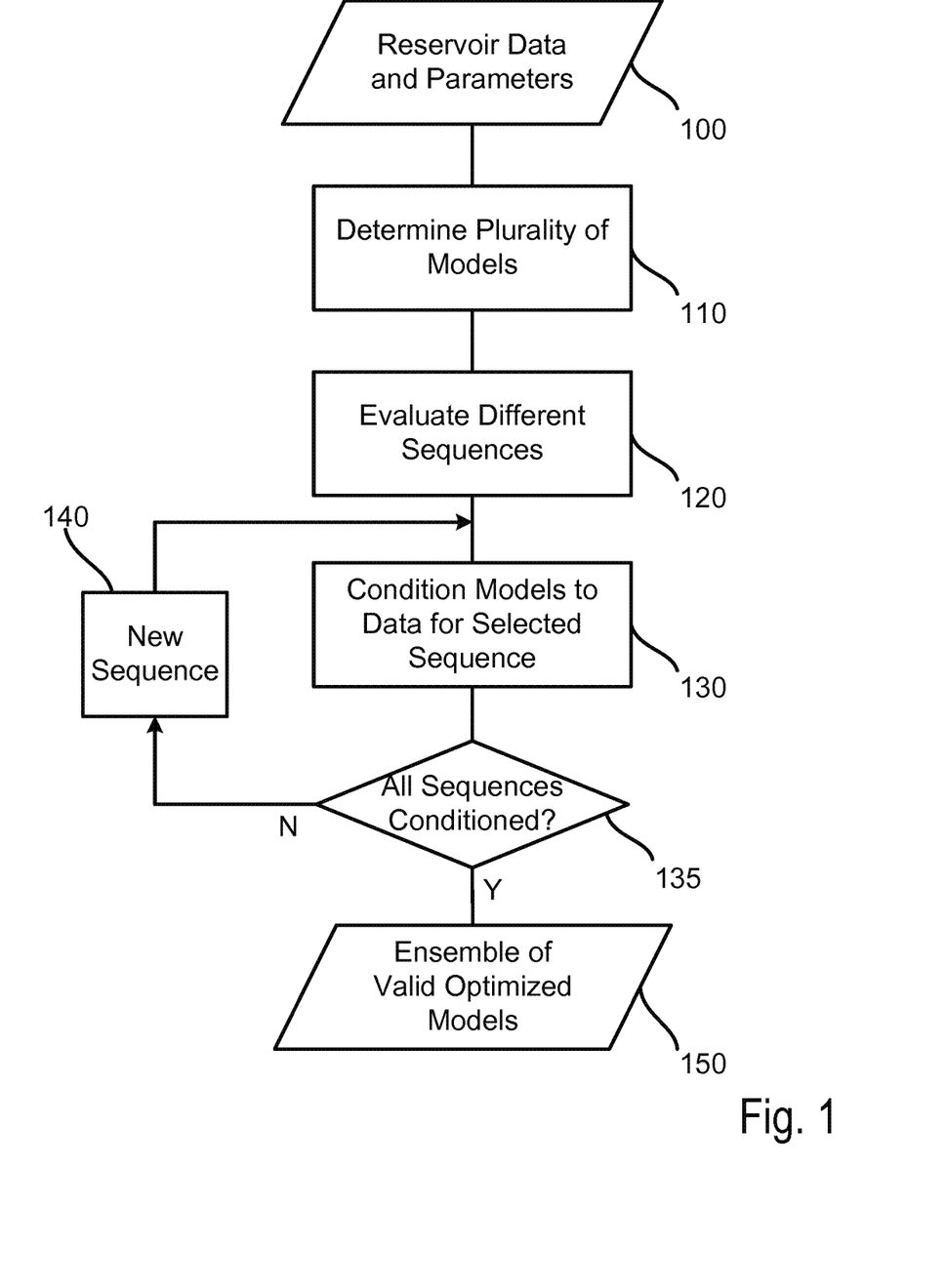
FIG. 1 comprises a flowchart describing a method according to an embodiment of the invention.

FIG. 1 is a flowchart describing a method for conditioning a parametric model. At step 110, a plurality of candidate model sequences (e.g., candidate domain or lobe sequences) described by a plurality of candidate models are determined for a reservoir zone, based on known reservoir data in terms of a plurality of (e.g., geometric/geologic) process parameters 100. Any suitable method can be used to create and represent the geometry of a plurality of candidate models, which can then be arranged according to their sequence. By way of example, a Non-uniform rational Basis spline (NURBS) method may be used to represent the geometry. NURBS is a mathematical modelling technique commonly used in computer graphics for generating and representing curves and surfaces. NURBS techniques are well known and will not be described further here.

At step 120, each candidate model sequence is evaluated to determine whether it is compatible with the known subsurface data (and are therefore valid sequences). This may be achieved using an algorithm for solving a constraint satisfaction problem, such as an intelligent backtracking algorithm, optionally with forward checking. A sequence may comprise a relative sequence or arrangement of domains with respect to the wells within a reservoir zone. By way of specific example, a first sequence may comprise domains 1 and 2 intersecting well 1, domain 3 intersecting well 2 and domains 4 and 5 intersecting well 3. Consequently, all models for which this is true can be said to comprise the same sequence. The constraint may be accepting as compatible only those candidate models for which each well is intercepted by at least one domain. As a result of step 120, one or more compatible sequences of domains is determined, each of which being embodied by a plurality of candidate models.

The models are then conditioned to the known data. This is done by conditioning all models of a particular sequence simultaneously 130. By determining possible sequences and grouping models according to these sequences, such simultaneous conditioning is possible. This is because, for a given sequence, all models describing that sequence will have the same basic arrangement (relative locations) of domains with respect to wells and therefore well data from a particular well will always be used in conditioning the same domain(s) for each candidate model of a sequence. The simultaneous conditioning may comprise simultaneously conditioning the candidate models, per domain, per compatible sequence. By way of contrast, present methods will condition each domain of each model separately, such that each model may take the same amount of time to condition. The simultaneous conditioning may be performed using an EnKF or ANN for example. At step 135 it is determined whether all valid sequences have been conditioned. If not, a new valid sequence is selected 140 and step 130 is repeated to condition the models of this sequence.

At step 150, the ensemble of valid (plausible) optimised models is returned. The parameters will all have been updated differently so each optimized model does not have the same final parameter values. All models which match the subsurface data are considered valid. The range of valid models generated captures the uncertainty in the reservoir description.

Figure 2:
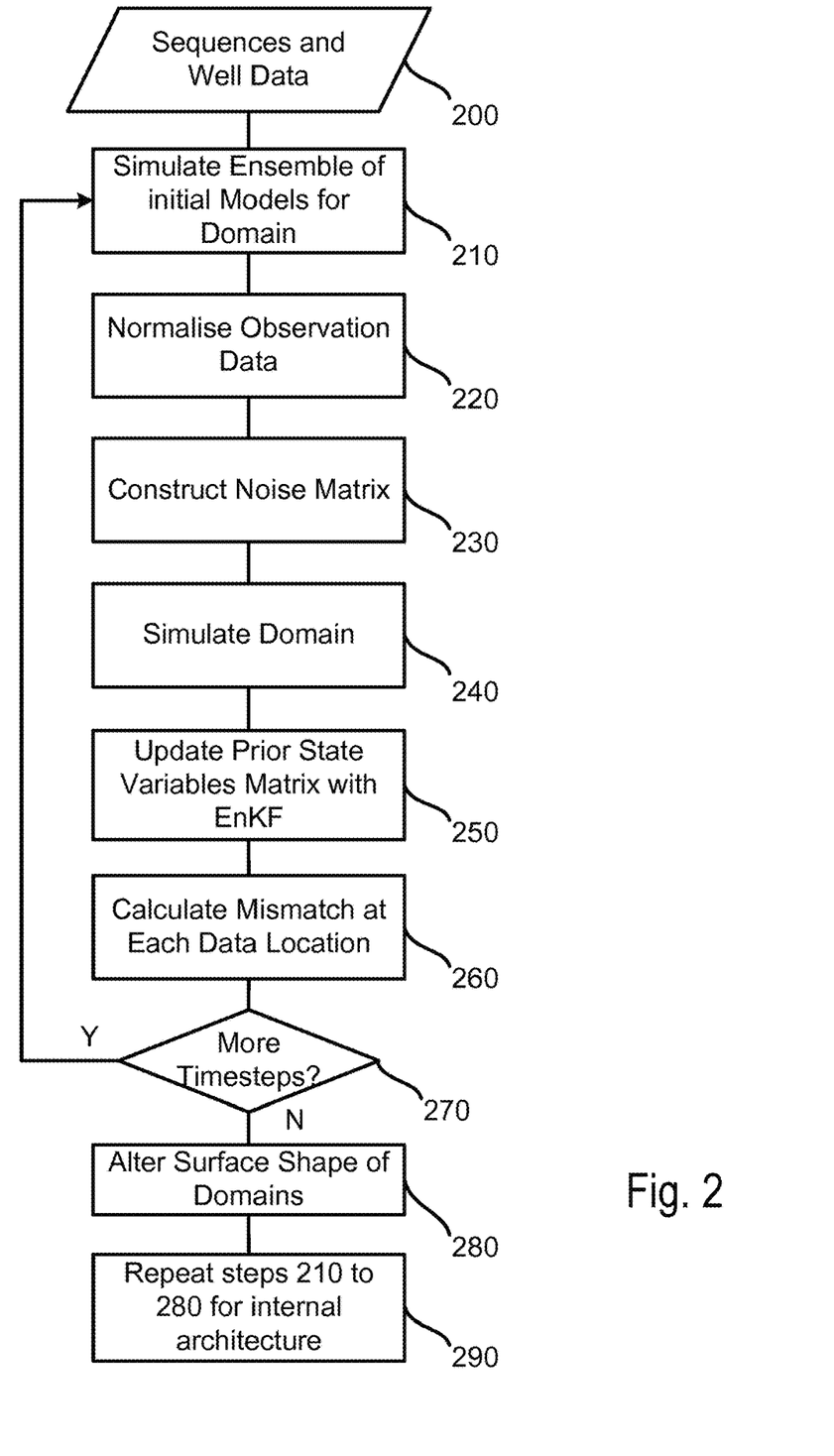
FIG. 2 comprises a flowchart describing in greater detail, step 130 of the flowchart of FIG. 1 according to a first embodiment.

FIG. 2 is a flowchart describing in greater detail, step 130 of the flowchart of FIG. 1, according to an embodiment.

Step 210: For a given sequence of geological domains 200 determined in step 120, an ensemble of initial unconditioned models for the first geological domain (timestep 1) is simulated. Each timestep refers to the conditioning of a different domain. The parameters to be optimized (both spatial and geometrical) in the conditioning of the geological domain across each member of the ensemble, are used to construct a prior state variables matrix.

Step 220: The EnKF reacts preferentially to resolve the greatest data mismatch, which inevitably creates a bias to minimize the error at specific locations rather than minimize the error between data. In order to remove this location bias, the observed data (or at least the non-zero observed data) is normalized. These data constitute the observation matrix at this timestep. For example, in a real situation the data being conditioned to may be at 0.9 m in a first well and at 10 m in a second well. The EnKF will try to minimize the 10 m data preferentially. The normalisation of the data results in each observation data being at the same distance (e.g., 1). Wells not used in the conditioning step are assigned zero.

Step 230: As the observed data for each timestep is confirmed and the size of observation matrix is known at each timestep, a matrix of observation noise of the same size as the observation matrix is also constructed at each timestep. The noise is the error a user attributes to the observation data. Taking as an example that the observation is the thickness of sand at the well. The measurement of thickness has an error associated with it. So in each model in the ensemble for each observation that is being conditioned, a matrix of the same size is constructed that takes this measurement error into account. The observation noise matrix is used to perturb the observed subsurface data.

Step 240: The geological domain for the timestep is simulated. The simulated data at subsurface data locations is normalized against the observed subsurface data. Normalized data compose the prior predictions matrix from initial geological models. For example, the running of the geological modelling algorithm to timestep one gives results for domain one; no conditioning has been done. At each data location (e.g., wells 1, 2, 3), the model is checked for e.g. sand thickness at the well. The prior predictions matrix is composed of the sand thickness values at each data location for each model in the ensemble with the model run to timestep one, before the model parameters have been updated with the Kalman Filter.

Step 250: The prior state variables matrix from step 210 is updated using the EnKF containing the perturbed observation data from steps 220 and 230 and the simulated data from step 240. Further iterations may be performed to obtain better conditioned geological domains due to small non-linear relationships between the geological parameters and the subsurface data. In an embodiment, the iterations stop when the mismatch between all the given subsurface data locations defined in step 210 has reached the local minimum.

Step 260: Traditionally, a model is conditioned to a fixed point without an error being taken into account. All of the conditioned models after the EnKF update are within the error defined in step 230. However, there may be a small mismatch resulting from the "fixed point" not taking into account the measurement error. Therefore, prior to conditioning the next geological domain, the mismatch at each individual subsurface data location defined in step 210 is calculated. If the subsurface data indicates only one geological domain at a given location and the conditioned model indicates a geological domain at this location, the subsurface data is excluded for the next timestep.

At 270 it is determined whether there are any remaining timesteps; if so steps 210 to 260 are repeated for the remaining timesteps. The geological modelling algorithm has a target number of domains to simulate. Once all domains have been simulated and all domains to be conditioned are conditioned the simulation can stop.

Step 280 (optional): There may still be a very small misfit between the observed data and the simulated data after conditioning the geological domains following steps 210 to 270. The geological domains themselves may be represented using non-uniform rational B-spines (NURBS), which are a parametric surface. In order to better match a given well marker, the control points of the NURBS may be updated to make small changes to the shape of the surfaces to provide a better (e.g., a 100%) match with observation data. For example, a suitable geostatistical algorithm such as a Sequential Gaussian Simulation may be used to do this.

Step 290: As a result of steps 210 to 280, the larger geological domains will now be conditioned to the static data. The larger domains are then used to constrain the positioning of the internal architecture. Steps 210 to 280 are repeated for conditioning the internal architecture within each of the larger domains.

In an embodiment, during conditioning of a particular (valid) sequence, members of the ensemble may be grouped into subsets of models. For example an ensemble comprising 100 members may be divided into 5 subsets of 20 members. The EnKF could then be used (or an ANN trained) on each of these subsets. This may reduce the non-linearity of the larger problem by increasing linearity in each of the subsets, which may help improve the convergence and the number of models that are well matched with the observed data. The grouping may comprise (for example) identifying a non-linear parameter with respect to the well data, and dividing the models that have this parameter into subsets where the parameter can now be updated linearly. By way of specific example, models which require an update to a clockwise orientation may be put into a first group, models which need to be updated counter-clockwise into a second group and models which require no updating into a third group. Alternatively, the EnKF may simply be used on all (e.g., 100) models.

Figure 3:
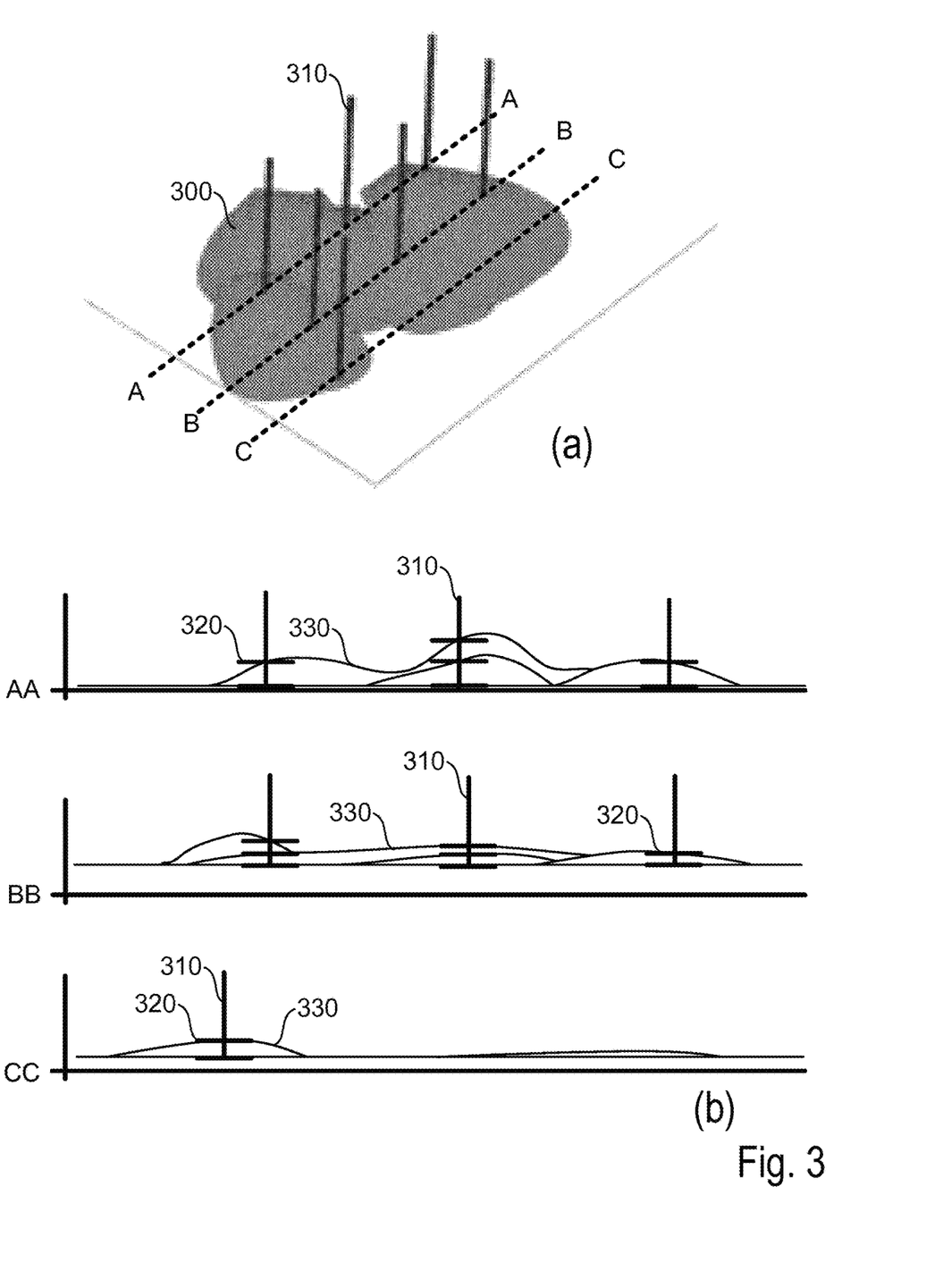

FIG. 3 illustrates the results of such a method. FIG. 3(a) is an example of conditioned geological domains 300 represented using NURBS. Also shown are the locations of wells 310. FIG. 3(b) shows the results of modelling the geological domains 300 through lines AA, BB and CC as represented in FIG. 3(a). The thick, horizontal lines 320 at the well 310 locations indicate known domain locations. The remaining curves 330 are modelled using the methods described herein. In this example multiple domains (lobes) appear at some well locations, which indicates lobe stacking.

Artificial Neural Network

As an alternative to the EnKF, an artificial neural network (ANN) can be used to optimize the model parameters for a given geological sequence. The goal of training an ANN is to set the weights in the network such that it can produce the same response as the geological modelling algorithm.

Figure 4:
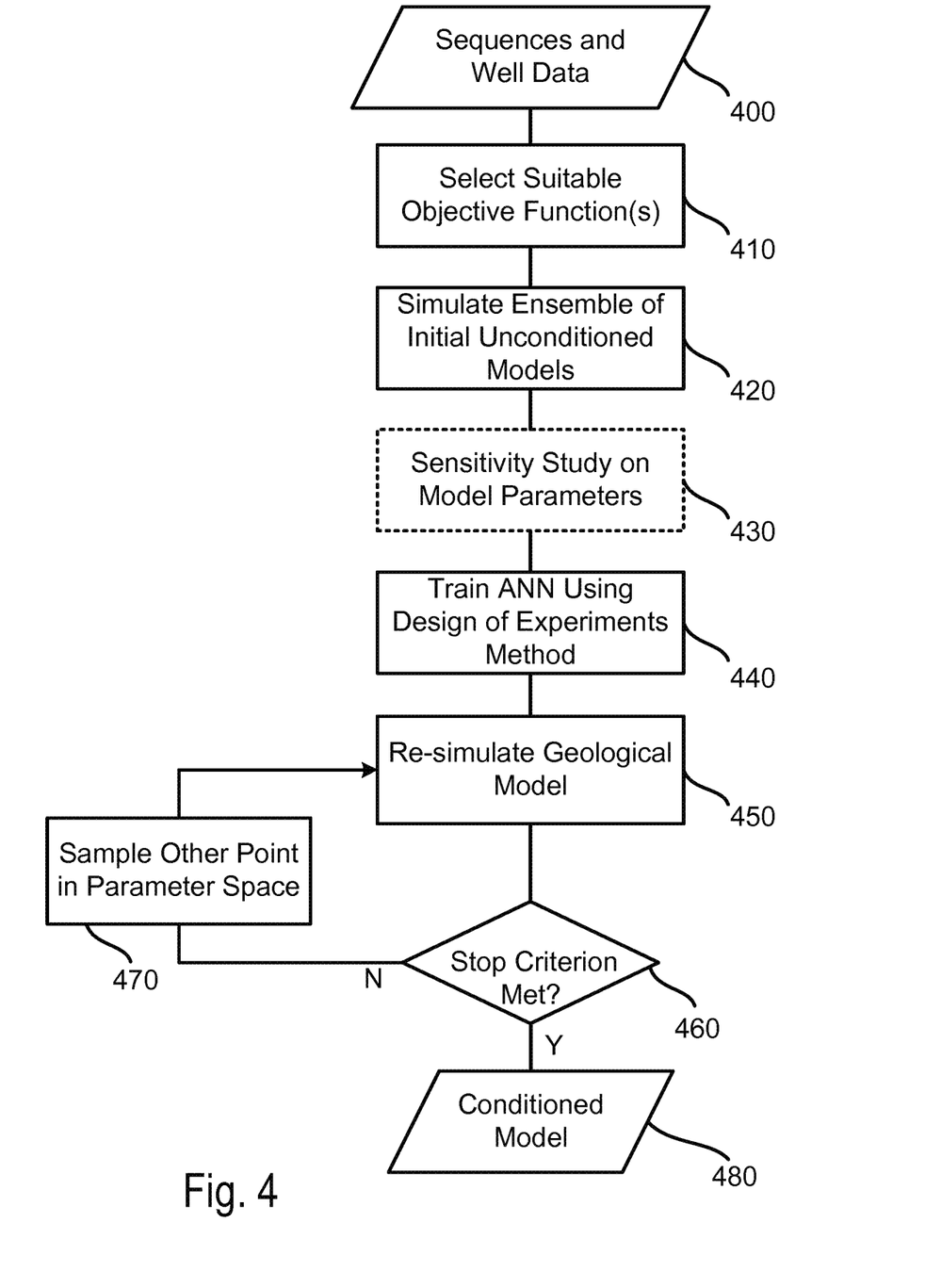
FIG. 4 comprises a flowchart describing in greater detail, step 130 of the flowchart of FIG. 1 according to a second embodiment.

FIG. 4 is a flowchart describing a method of conditioning geological domains using an ANN. As with FIG. 2, this flowchart represents a possible expansion of step 130 of FIG. 1.

Step 410: A suitable objective function for conditioning is chosen. Any suitable metric for measuring the response of the model versus observed data could be used. A separate objective function can be applied to each geological domain as each domain will invoke a different model response with respect to the subsurface data.

Step 420: For a given sequence of geological domains 400, an ensemble of initial unconditioned models for all domains is simulated. The maximum, minimum and median of each of the parameters to be optimized (both spatial and geometrical) in the conditioning of the geological domains across the ensemble, are sampled from this initial ensemble. The parameter distributions of the model may differ from the initial input distributions to the geological modelling algorithm, as the distributions were modified in order to generate a valid sequence with respect to the subsurface data. This forms the prior distribution of model variables, and a corresponding prior distribution parameter space.

Step 430: Optionally, a sensitivity study on the model parameters may be performed in order to reduce the number of parameters for optimization. However, this step may be skipped, particularly where there are only few inputs.

Step 440: A design of experiments method is then used to sample points from the prior distribution parameter space in order to train the ANN.

Step 450: The geological model is then re-simulated using the model parameter values unique to each sampled point in the parameter space. This generates the first training data set for the ANN. The ANN itself comprises three layers: an input layer that receives the parameters (that is the model parameters to be conditioned) of the function to be approximated (that is the geological modelling algorithm response), a hidden layer and an output layer having a number of outputs equal to the number of objective functions.

Step 460: The results of the ANN are then compared with a given stop criterion. This stop criterion may be determined by the user, and, for example could be an acceptable mismatch between simulated parameter values and the observed subsurface data.

Step 470: If the stop criterion has not been met, another point in the parameter space initially defined in step 440 is sampled. The geological modelling algorithm is then run using the new parameter values. If this point does not meet the stop criterion then it is added to the training data of the existing ANN and an updated ANN is trained.

Steps 450 to 470 are repeated until the stop criterion is met. The conditioned model 480 is that which comprises the parameter values (simulated data) used to meet the stop criterion, Steps 410 to 470 are repeated for all valid sequences determined in step 120.

Unlike present conditioning methods, the methods disclosed herein sample statistics from an ensemble of related models to optimize the geological model parameters in order to minimise the misfit with static data. Multiple models are used to determine how to optimize each parameter simultaneously rather than conditioning each model and parameter independently, or using rejection sampling. This results in greater efficiency in conditioning the models. The same conditioning errors are not repeated multiple times between each model, such as would be the case when conditioning models independently.

The methods disclosed can be applied to models that contain domains over multiple lengthscales, such as nested deepwater lobe systems, which is not possible with prior techniques. Methods described herein may be an order of magnitude (or more) faster than previously documented approaches. This allows the geologist more time to assess the impact of a wider range of uncertainties and concepts over conventional techniques in the same time period. Finally, no previous approach has decoupled the problem into two components or used a backtracking algorithm to increase efficiency.

The Ensemble Kalman Filter technique is frequently applied on automated history matching problems for dynamic reservoir simulations. However, the Ensemble Kalman Filter technique has not been previously reported for conditioning geological models to static data.

Further advantages of the methods disclosed herein include conservation of the variability of the input geological parameters between models, in contrast to conventional techniques. The technique will reduce the uncertainty of the geological parameters that match the subsurface data. As the amount of data increases, there is a reduction in the mismatch between observed and simulated data. This does not hold true for conventional techniques. The methods disclosed are less computationally intensive than conventional techniques and therefore does not require specialist computing resources.

One or more steps of the methods and concepts described herein may be embodied in the form of computer readable instructions for running on suitable computer apparatus, or in the form of a computer system comprising at least a storage means for storing program instructions embodying the concepts described herein and a processing unit for performing the instructions. As is conventional, the storage means may comprise a computer memory (of any sort), and/or disk drive, optical drive or similar. Such a computer system may also comprise a display unit and one or more input/output devices.

The concepts described herein find utility in all aspects of surveillance, monitoring, optimisation and prediction of hydrocarbon reservoir and well systems, and may aid in, and form part of, methods for extracting hydrocarbons from such hydrocarbon reservoir and well systems.

It should be appreciated that the above description is for illustration only and other embodiments and variations may be envisaged without departing from the spirit and scope of the invention.

The invention claimed is:

1. A parametric model conditioning method comprising:
   obtaining a plurality of candidate parametric models, each describing a sequence of domains characterising a subsurface region;
   determining whether each sequence of domains described by one or more of the candidate parametric models is a valid sequence of domains; and
   for each valid sequence of domains, simultaneously conditioning a plurality of the candidate parametric models describing that valid sequence of domains.

2. The method as claimed in claim 1 comprising, for each valid sequence of domains, simultaneously conditioning all of the candidate parametric models describing that valid sequence of domains.

3. The method as claimed in claim 1 comprising:
   dividing the candidate parametric models describing at least one of the determined validsequences of domains into subsets of candidate parametric models; and
   simultaneously conditioning the candidate parametric models of each subset of candidate parametric models.

4. The method as claimed in claim 1, wherein the step of simultaneously conditioning each candidate parametric model comprises, for each valid sequence of domains:
   performing a simulation to obtain simulated data for each candidate parametric model describing that valid sequence of domains; and
   optimising the simulated data against observed data relating to the domain.

5. The method as claimed in claim 4 wherein the step of optimizing the simulated data comprises minimising a misfit between the simulated data and the observed data.

6. The method as claimed in claim 4 wherein the step of simultaneously conditioning each candidate parametric model is performed for each domain for each valid sequence of domains.

7. The method as claimed in claim 4, wherein the step of simultaneously conditioning each candidate parametric model comprises using an Ensemble Kalman Filter to optimise model parameters of each candidate parametric model.

8. The method as claimed in claim 7 wherein the step of simultaneously conditioning each candidate parametric model using an Ensemble Kalman Filter comprises performing one or more iterations of the following steps, for each domain of each valid sequence of domains:
   constructing a prior states variables matrix from the model parameters being optimized across the candidate parametric models of the valid sequence of domains;
   constructing an observation matrix comprising the observed data relating to the domain;
   constructing an observation noise matrix describing uncertainty in the observed data;
   perturbing the observed data with the observation noise matrix to obtain perturbed observed data;

performing the simulation to simulate the domain to obtain the simulated data;

updating the prior states variables matrix using the Ensemble Kalman Filter containing the perturbed observed data and the simulated data.

9. The method as claimed in claim 8 comprising the step of normalizing the observed data.

10. The method as claimed in claim 8 wherein the iterations are performed until a mismatch between all given subsurface data locations defined in the construction of the prior states variables matrix has reached a local minimum.

11. The method as claimed in claim 4, wherein the step of simultaneously conditioning each candidate parametric model comprises using an artificial neural network method to optimise model parameters describing each valid sequence of domains.

12. The method as claimed in claim 11, comprising training an artificial neural network by setting weights in the artificial neural network such that the output of the artificial neural network corresponds with the output of a geological modelling algorithm used to perform the simulation.

13. The method as claimed in claim 12 comprising, for each valid sequence of domains, performing the steps of:

determining at least one objective function for comparing output parameter values of the artificial neural network and the observed data;

performing the simulation to obtain the simulated data and corresponding prior distribution data defining a prior distribution parameter space relating to the model parameters;

sampling points from the prior distribution parameter space and training the artificial neural network by repeating the simulation using the parameter values from the sampled points;

determining whether a mismatch between the output parameter values of the artificial neural network and observed data parameter values meets a threshold;

determining the output parameter values to be optimized parameter values when the threshold is met.

14. The method as claimed in claim 13 wherein the determined objective function is different for at least two domains in a valid sequence of domains.

15. The method as claimed in claim 13 wherein the artificial neural network comprises an input layer which receives the model parameters of the geological modelling algorithm, a hidden layer and an output layer having a number of outputs equal to the number of the objective functions.

16. The method as claimed in claim 1, comprising conditioning larger domains in an initial stage and using these larger domains to constrain the positioning of internal domains in a further stage.

17. The method as claimed in claim 1, comprising:

determining a mismatch between each candidate parametric model and observed data; and altering one or more geometric parameters of the selected model(s) to further minimise or eliminate the mismatch.

18. The method as claimed in claim 1, wherein each candidate parametric model comprises a surface-based model.

19. The method as claimed in claim 18 wherein each candidate parametric model is a non-uniform rational basis spline model.

20. The method as claimed in claim 1, comprising the step of generating the plurality of candidate parametric models.

21. The method as claimed in claim 1, wherein a valid sequence of domains comprises a sequence of domains which is valid with respect to well measurements and/or seismic measurements performed on the subsurface region.

22. The method as claimed in claim 21 wherein the step of determining whether each sequence of domains described by one or more of the candidate parametric models is a valid sequence of domains comprises solving a constraint satisfaction problem based on the measurements and/or seismic measurements.

23. The method as claimed in claim 22 wherein the solving a constraint satisfaction problem comprises employing a backtracking or backjumping algorithm.

24. The method as claimed in claim 22 wherein the solving a constraint satisfaction problem comprises employing a forward checking algorithm.

25. The method as claimed in claim 1, comprising excluding subsurface data from conditioning of a subsequent domain when that subsurface data indicates only one geological domain at a given location and the conditioned model indicates a geological domain at this location.

26. The method as claimed in claim 1, further comprising the step of using the results of the method to aid hydrocarbon recovery from a reservoir.

27. A computer program product comprising a non-transitory computer readable storage medium storing instructions which, when run on a suitable computer apparatus, cause the computer apparatus to perform the method of claim 1.

28. A computer apparatus comprising a processor specifically adapted to carry out the steps of the method as claimed claim 1.

* * * * *

UNITED STATES PATENT AND TRADEMARK OFFICE
CERTIFICATE OF CORRECTION

| | | |
|---|---|---|
| PATENT NO. | : 11,513,255 B2 | Page 1 of 1 |
| APPLICATION NO. | : 16/500474 | |
| DATED | : November 29, 2022 | |
| INVENTOR(S) | : Zhang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 580 days.

Signed and Sealed this
Twenty-eighth Day of January, 2025

Coke Morgan Stewart
*Acting Director of the United States Patent and Trademark Office*